(12) United States Patent
Fu et al.

(10) Patent No.: US 9,426,461 B2
(45) Date of Patent: Aug. 23, 2016

(54) METHOD FOR BINARIZING INTRA PREDICTION MODE AND METHOD, APPARATUS, AND SYSTEM FOR DECODING INTRA PREDICTION MODE

(71) Applicant: Huawei Technologies Co., Ltd., Shenzhen, Guangdong (CN)

(72) Inventors: Jiali Fu, Shenzhen (CN); Haitao Yang, Shenzhen (CN); Jingjing Dai, Shenzhen (CN); Zilian Qu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 581 days.

(21) Appl. No.: 13/942,411

(22) Filed: Jul. 15, 2013

(65) Prior Publication Data

US 2013/0315304 A1    Nov. 28, 2013

Related U.S. Application Data

(63) Continuation of application No. PCT/CN2011/080310, filed on Sep. 28, 2011.

(30) Foreign Application Priority Data

Jan. 15, 2011   (CN) .......................... 2011 1 0008145

(51) Int. Cl.
*H04N 7/26* (2006.01)
*H04N 19/50* (2014.01)
(Continued)

(52) U.S. Cl.
CPC ......... *H04N 19/00569* (2013.01); *H04N 19/13* (2014.11); *H04N 19/159* (2014.11); *H04N 19/176* (2014.11); *H04N 19/463* (2014.11); *H04N 19/105* (2014.11); *H04N 19/593* (2014.11)

(58) Field of Classification Search
CPC .......... H04N 19/00569; H04N 19/159; H04N 19/176; H04N 19/13; H04N 19/463; H04N 19/105; H04N 19/593
USPC .................................................... 375/240.12
See application file for complete search history.

(56) References Cited

U.S. PATENT DOCUMENTS

| 2007/0237224 | A1 | 10/2007 | Krishnan |
| 2012/0177112 | A1* | 7/2012 | Guo ....................... H04N 19/13 375/240.12 |
| 2013/0272401 | A1 | 10/2013 | Seregin et al. |

FOREIGN PATENT DOCUMENTS

| CN | 1784015 A | 6/2006 |
| CN | 101309408 A | 11/2008 |

(Continued)

OTHER PUBLICATIONS

International Search Report dated Jan. 5, 2012 in connection with International Patent Application No. PCT/CN2011/080310.

*Primary Examiner* — Hee-Yong Kim

(57) ABSTRACT

A method and an apparatus for binarizing an intra prediction mode are provided. The method includes: acquiring an intra prediction mode of a luma component; if the intra prediction mode of the luma component is one kind of prediction mode in M, modifying a value of a serial number of a prediction mode Luma Angle of a chroma component to I; sequencing all prediction modes of the chroma component according to a preset rule; and performing binarization on the modified Luma Angle, and sending the binarized Luma Angle to a decoding end. A method for coding an intra prediction mode and a method and an apparatus for decoding an intra prediction mode are further provided. According to the present invention, coding efficiency is improved.

6 Claims, 4 Drawing Sheets

(51) Int. Cl.
*H04N 19/159* (2014.01)
*H04N 19/176* (2014.01)
*H04N 19/13* (2014.01)
*H04N 19/463* (2014.01)
*H04N 19/105* (2014.01)
*H04N 19/593* (2014.01)

(56) References Cited

FOREIGN PATENT DOCUMENTS

| | | |
|---|---|---|
| CN | 101494792 A | 7/2009 |
| CN | 101742330 A | 6/2010 |
| CN | 103392341 A | 11/2013 |

* cited by examiner

METHOD FOR BINARIZING INTRA PREDICTION MODE AND METHOD, APPARATUS, AND SYSTEM FOR DECODING INTRA PREDICTION MODE

CROSS-REFERENCE TO RELATED APPLICATIONS

This application is a continuation of International Application No. PCT/CN2011/080310, filed on Sep. 28, 2011, which claims priority to Chinese Patent Application No. 201110008145.2, filed on Jan. 15, 2011, both of which are hereby incorporated by reference in their entireties.

TECHNICAL FIELD

The present invention relates to the field of communications technologies, and in particular, to a method for binarizing an intra prediction mode and a method, an apparatus, and a system for decoding an intra prediction mode in video coding and decoding.

BACKGROUND

In a coding architecture of high-efficiency video coding (High-efficiency Video Coding, HEVC), intra prediction (Intra Prediction) may be performed on a chroma component and a luma component by using directional prediction (Directional Prediction) and direct current prediction (DC Prediction). The Directional Prediction refers to performing prediction by using surrounding reconstructed pixel values according to a certain direction, and the DC Prediction refers to performing prediction by using an average value of reconstructed pixel values around a current pixel. When Intra Prediction is performed on a luma value, 34 kinds of prediction modes (Prediction Mode) can be selected, including DC Prediction and 33 kinds of directional prediction. During a video coding and decoding process, not all of the foregoing 34 kinds of prediction modes may be used, and other newly-extended prediction modes may also exist. The number of kinds of prediction modes is not limited in embodiments of the present invention.

In one example, when Intra Prediction is performed on a chroma component, the number of chroma Prediction Modes may be 5. As shown in Table 1, the five example Prediction Modes are: 0 - - - Vertical Prediction, 1 - - - Horizontal Prediction, 2 - - - DC Prediction, 3 - - - Down-Right Prediction, and 4 - - - chroma component prediction mode Luma Angle (indication: using the same prediction direction as a luma component). After an encoding end performs code rate distortion optimization to select an optimal Prediction Mode, binarization and entropy coding need to be performed on information of the optimal Prediction Mode and the coded information is transmitted to a decoding end, so as to ensure that the decoding end performs decoding correctly.

TABLE 1

Intra prediction mode of a chroma component in HEVC

| Mode Number mode number | Prediction Mode prediction mode |
|---|---|
| Mode 0 | Vertical Prediction |
| Mode 1 | Horizontal Prediction |
| Mode 2 | DC Prediction |
| Mode 3 | Down-right Prediction |
| Mode 4 | Luma Angle |

At the encoding end, binarization of a Prediction Mode is implemented as follows: If Prediction Mode=0, a flag=0 is output; otherwise, a flag=1 is output; and then, unary code (Unary Code) coding (Prediction Mode−1) is performed by using binarization coding to obtain a coding result. In the embodiments of the present invention, the binarization coding refers to a binarization coding manner in which the number of coding bits increases as a numeral of an input Mode increases, which is not described again in other parts of the embodiments of the present invention.

The foregoing Unary Code is a coding method for an integer belonging to [0, s]. When an input x satisfies 0<=x<s, an output result of the Unary Code is x 1s and one 0, and if s is input, an output result is s 1s.

At the decoding end, after a binary sequence is obtained through decoding, a Prediction Mode of the chroma component may be obtained through the following method: If a binary sequence bit is 0, a Prediction Mode number is 0; otherwise, decoding is performed according to a Unary Code principle; and if L is obtained through decoding, the Prediction Mode number is L+1.

It can be known from the foregoing binarization solution and the coding principle of the Unary Code that: When a value corresponding to the Prediction Mode is larger, more coding bits are needed. The Prediction Mode of the chroma component tends to be consistent with a Prediction Mode of a luma component. For example, when the Prediction Mode of the luma component is Modes 0~3, Luma Angle may replace Modes 0~3; and when the Prediction Mode of the luma component is not any one of Modes 0~3, the Luma Angle cannot replace Modes 0~3, and in this case, a probability that the prediction mode of the chroma component is the Luma Angle is generally high. Because lots of bits are needed to code the Luma Angle and the probability that the prediction mode of the chroma component is the Luma Angle is high, the efficiency of a coding manner of the foregoing binarization solution is low.

SUMMARY

Embodiments of the present invention provides a method, an apparatus, and a system for binarizing an intra prediction mode, so as to solve a technical problem, and improve coding efficiency.

To solve the foregoing technical problem, a method embodiment for binarizing an intra prediction mode provided in the present invention may be implemented through the following technical solutions.

A method for binarizing an intra prediction mode includes:
acquiring an intra prediction mode of a luma component, if the intra prediction mode of the luma component is one kind of prediction mode in M, modifying a value of a serial number of a prediction mode Luma Angle of a chroma component to I, and then sequencing all prediction modes of the chroma component except the acquired intra prediction mode according to a preset rule, where a set of the same intra prediction modes of the luma component and the chroma component is M, and I is less than the value of the serial number of the Luma Angle, where the value is a value before modification; and performing binarization on the modified Luma Angle, and sending the binarized Luma Angle to a decoding end.

A method for binarizing an intra prediction mode includes:
performing decoding on a received coded video frame to obtain a prediction mode of a chroma component;

if an intra prediction mode of a luma component is one kind of prediction component in M, modifying a serial number I of a prediction mode Luma Angle of the chroma component to an original serial number of the Luma Angle, where the original serial number is a serial number before an encoding end modifies the Luma Angle, where a set of the same intra prediction modes of the luma component and the chroma component is M, and I is less than a value of the serial number of the Luma Angle, where the value is a value before modification; and acquiring the prediction mode of the chroma component according to the original serial number.

An apparatus for binarizing an intra prediction mode includes:

a luma acquiring unit, configured to acquire an intra prediction mode of a luma component;

a first modifying unit, configured to: if the intra prediction mode of the luma component is one kind of prediction mode in M, and modify a value of a serial number of a prediction mode Luma Angle of a chroma component to I, where a set of the same intra prediction modes of the luma component and the chroma component is M, and I is less than the value of the serial number of the Luma Angle, where the value is a value before modification;

a sequencing unit, configured to sequence all prediction modes of the chroma component except the acquired intra prediction mode according to a preset rule;

a binarizing unit, configured to perform binarization on the modified Luma Angle; and a sending unit, configured to send a binarization result to a decoding end.

An apparatus for binarizing an intra prediction mode includes:

a decoding unit, configured to perform decoding on a received coded video frame to obtain a prediction mode of a chroma component;

a second modifying unit, configured to: if an intra prediction mode of a luma component is one kind of prediction mode in M, modify a serial number I of a prediction mode Luma Angle of the chroma component to an original serial number of the Luma Angle, where the original serial number is a serial number before an encoding end modifies the Luma Angle, a set of the same intra prediction modes of the luma component and the chroma component is M, and I is less than a value of the serial number of the Luma Angle, where the value is a value before modification; and a mode acquiring unit, configured to acquire the prediction mode of the chroma component according to the original serial number.

A communication system includes an encoding device and a decoding device, where the encoding device and the decoding device are apparatuses provided in the embodiments of the present invention.

The foregoing technical solutions has the following beneficial effects: In the embodiments of the present invention, if an intra prediction mode of a luma component is one kind of prediction mode in M, a value of a serial number of a prediction mode Luma Angle of a chroma component is modified to I. Then, all prediction modes of the chroma component except the acquired intra prediction mode are sequenced according to a preset rule. A set of the same intra prediction modes of the luma component and the chroma component is M, and I is less than the value of the serial number of the Luma Angle, where the value is a value before modification. Therefore, coding efficiency is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

A method for coding an intra prediction mode includes:

selecting, based on a luma prediction mode, a corresponding binarization method to code a chroma prediction mode, and sending the coded chroma prediction mode to a decoding end.

Figure 1:
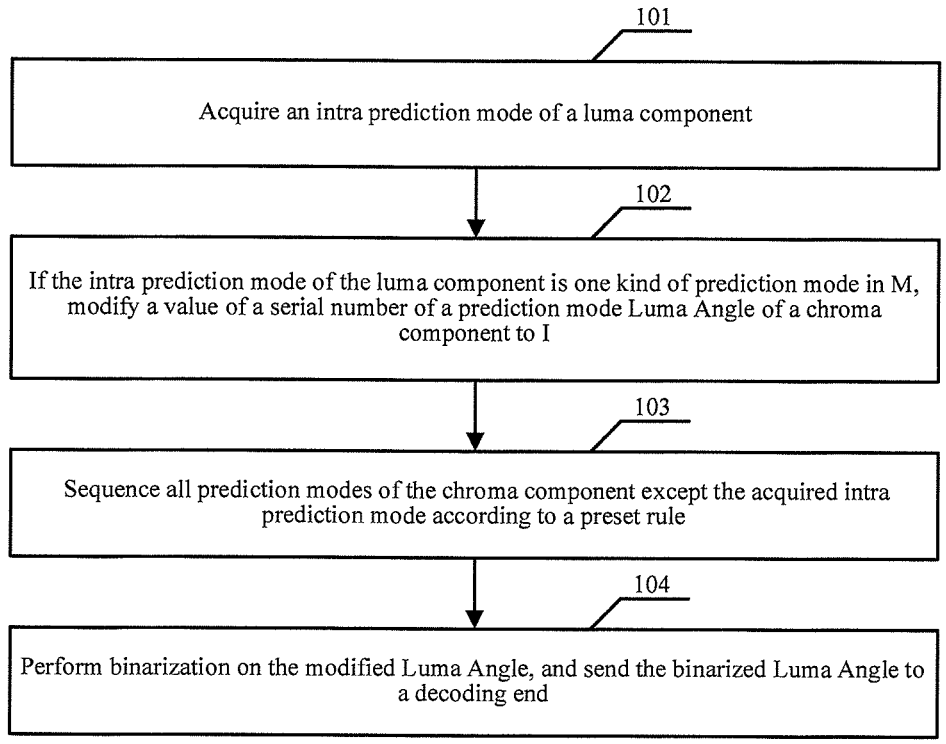
FIG. 1 is a schematic flowchart of a method according to an embodiment of the present invention.

A method for binarizing an intra prediction mode, as shown in FIG. 1, includes:

101: Acquire an intra prediction mode of a luma component.

102: If the intra prediction mode of the luma component is one kind of prediction mode in M, modify a value of a serial number of a prediction mode Luma Angle of a chroma component to I.

A set of the same intra prediction modes of the luma component and the chroma component is M, and I is less than the value of the serial number of the Luma Angle, where the value is a value before modification.

In order to maximize an effect, I is 0. Definitely, as long as the value of the serial number of the Luma Angle is greater than I, where the value is a value before modification, the solution of the present invention has an effect.

103: Sequence all prediction modes of the chroma component except the acquired intra prediction mode according to a preset rule.

104: Perform binarization on the modified Luma Angle, and send the binarized Luma Angle to a decoding end.

In this embodiment of the present invention, if an intra prediction mode of a luma component is one kind of prediction mode in M, a value of a serial number of a prediction mode Luma Angle of a chroma component is modified to I.

Then, all prediction modes of the chroma component except the acquired intra prediction mode are sequenced according to a preset rule. A set of the same intra prediction modes of the luma component and the chroma component is M, and I is less than the value of the serial number of the Luma Angle, where the value is a value before modification. Therefore, coding efficiency is improved.

More specifically, values of serial numbers of all the prediction modes of the chroma component are numbered successively with natural numbers, and I is a natural number that is greater than or equal to zero. The sequencing all prediction modes of the chroma component except the acquired intra prediction mode according to a preset rule in 103 includes:

if the acquired intra prediction mode is another prediction mode outside M, adding 1 to a value of a serial number, which is less than or equal to a value of a serial number of the acquired intra prediction mode and greater than or equal to I, among all the prediction modes of the chroma component except the acquired intra prediction mode; and if the acquired intra prediction mode belongs to M, adding 1 to a value of a serial number, which is less than I, among all the prediction modes of the chroma component except the acquired intra prediction mode.

Further, if the intra prediction mode of the luma component is another prediction mode outside M, the value of the serial number of the prediction mode Luma Angle of the chroma component is modified to I, and then all the prediction modes of the chroma component are sequenced according to the preset rule; and binarization is performed on the modified Luma Angle, and the binarized Luma Angle is sent to the decoding end.

More specifically, if the values of the serial numbers of all the prediction modes of the chroma component are numbered successively with natural numbers, and I is a natural number that is greater than or equal to zero, performing sequencing according to the preset rule includes: adding 1 to a value of a serial number of a prediction mode whose serial number is greater than or equal to I among all the prediction modes of the chroma component.

Figure 2:
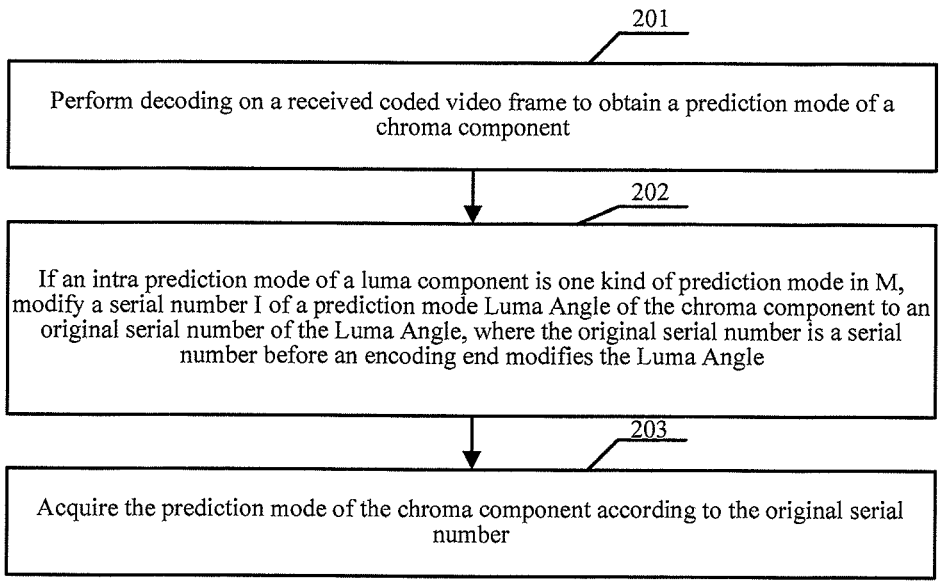
FIG. 2 is a schematic flowchart of a method according to an embodiment of the present invention.

The foregoing method may be implemented at an encoding end. An embodiment of the present invention further provides a decoding method implemented at a decoding end. As shown in FIG. 2, the decoding method includes:

selecting, based on a luma prediction mode, a corresponding inverse binarization method to decode a chroma prediction mode, and using the decoded chroma prediction mode to complete a decoding process.

201: Perform decoding on a received coded video frame to obtain a prediction mode of a chroma component.

202: If an intra prediction mode of a luma component is one kind of prediction mode in M, modify a serial number I of a prediction mode Luma Angle of the chroma component to an original serial number of the Luma Angle, where the original serial number is a serial number before an encoding end modifies the Luma Angle, a set of the same intra prediction modes of the luma component and the chroma component is M, and I is less than a value of the serial number of the Luma Angle, where the value is a value before modification.

203: Acquire the prediction mode of the chroma component according to the original serial number.

Further, if the intra prediction mode of the luma component is another prediction mode outside M, the serial number I of the prediction mode Luma Angle of the chroma component is modified to the original serial number of the Luma Angle, where the original serial number is a serial number before the encoding end modifies the Luma Angle.

The prediction mode of the chroma component is acquired according to the original serial number.

In the following embodiment, the foregoing method is described by taking that I is less than or equal to a value of a serial number of the acquired intra prediction mode of the luma component as an example, which is specifically as follows:

Two examples corresponding to the method in FIG. 1 are described in the following:

1. Corresponding to an example that the number of kinds of chroma Prediction Modes is 5 when Intra Prediction is performed on a chroma component in the background, when a Prediction Mode of the luma component is not Modes 0 to 3, a probability that 4 is selected as an optimal Prediction Mode of the chroma component is highest. A binarization solution adopted in this embodiment of the present invention is as follows:

Encoding End:

If the Prediction Mode of the luma component is Modes 0 to 3, a solution in the background may be used to perform coding; otherwise, an original Chroma Prediction Mode is transformed into a new Mode: New Mode according to a manner in Table 2. That is to say, when the Chroma Prediction Mode is Luma Angle, the New Mode is equal to 0; otherwise, New Mode=Chroma Prediction Mode+1. Then, binarization may be performed on the New Mode with reference to a binarization method in the background. A coding manner is not limited to using the Unary Code, and may use a coding manner that has the same feature as the Unary Code, that is, any manner where the larger the input numeral is, the larger the number of bits required for coding is. A mapping between a Chroma Prediction Mode and a New Mode is shown in Table 2 in the following:

TABLE 2

Mapping between a Chroma Prediction Mode and a New Mode

| Chroma Prediction Mode | New Mode |
|---|---|
| Chroma Prediction Mode | New Mode |
| Luma Angle | Mode 0 |
| Vertical Prediction | Mode 1 |
| Horizontal Prediction | Mode 2 |
| DC Prediction | Mode 3 |
| Down-right Prediction | Mode 4 |

Decoding End:

If the Prediction Mode of the luma component is Modes 0 to 3, decoding may be performed with reference to a solution in the background; otherwise, decoding may be performed with reference to the solution in the background and then a decoding output is assigned to the New Mode; and then the New Mode is transformed into the Chroma Prediction Mode in an inverse manner according to Table 2. That is to say, when the New Mode is 0, the Chroma Prediction Mode is Luma Angle; otherwise, the Chroma Prediction Mode=New Mode−1. Finally, decoding may be performed with reference to the solution in the background.

2. If an intra prediction mode of the chroma component includes M kinds of Prediction Modes that are the same as those of the intra prediction mode of the luma component and includes N intra prediction modes exclusive to chroma including Luma Angle, a binarization solution adopted in this embodiment of the present invention is as follows:

If the Prediction Mode of the luma component is one of the foregoing M kinds of Modes, coding may be performed with reference to the solution in the background; otherwise, an original Chroma Prediction Mode is transformed into a new Mode: New Mode. The New Mode can be obtained by transforming the Luma Angle into a smaller Mode, and a method that may be adopted is as follows: A New Mode corresponding to the Luma Angle is a Mode i, where i is less than a maximum Mode; for another Prediction Mode, a corresponding New Mode is as follows: If Chroma Prediction Mode<i, New Mode=Chroma Prediction Mode; otherwise, New Mode=Chroma Prediction Mode+1. Then, binarization may be performed on the New Mode with reference to the binarization method in the background.

Figure 3:
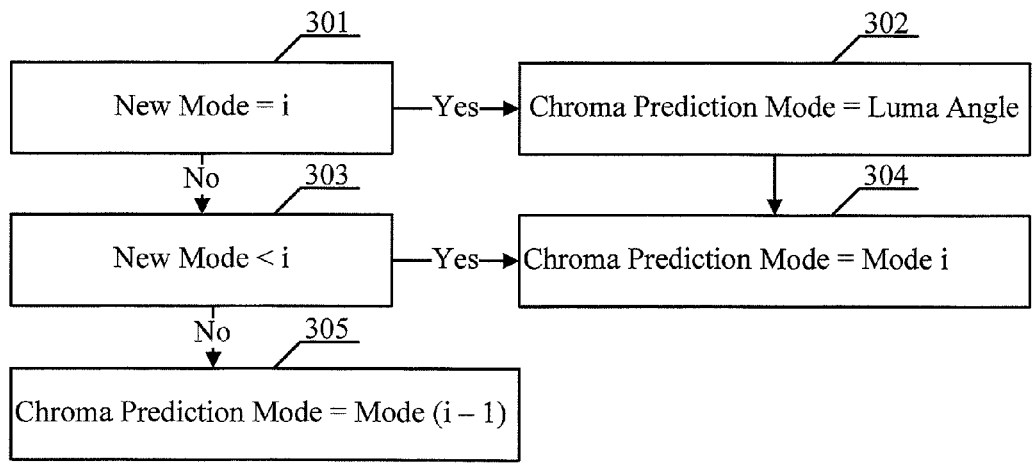
FIG. 3 is a schematic flow chart of a method according to an embodiment of the present invention.

Decoding End:

If the Prediction Mode of the luma component is one of the foregoing M kinds of Modes, decoding may be performed with reference to the solution in the background; otherwise, decoding may be performed with reference to the solution in the background and then a decoding output is assigned to the New Mode; and then the New Mode is transformed into the Chroma Prediction Mode in an inverse manner. Finally, decoding may be performed with reference to the solution in the background. A specific inverse transformation method may be shown in FIG. 3:

301: Determine whether New Mode=i, if yes, proceed to 302, and if no, proceed to 303.

302: Determine that Chroma Prediction Mode=Luma Angle.

303: Determine whether New Mode<i, if yes, proceed to 304, and if no, proceed to 305.

304: Determine that Chroma Prediction Mode=Mode i.

305: Determine that Chroma Prediction Mode=Mode (i−1).

Two examples corresponding to the method shown in FIG. 2 are described in the following:

1. Corresponding to an example that the number of kinds of chroma Prediction Modes is 5 when Intra Prediction is performed on a chroma component in the background, a binarization solution adopted in this embodiment of the present invention is as follows:

Encoding End:

The original 5 kinds of Chroma Prediction Modes are transformed into new Modes: New Modes according to a Prediction Mode of the luma component. A mapping between an original Prediction Mode and a New Mode is shown in Table 3. When the luma Prediction Mode of the luma component is one of the first 4 kinds of Prediction Modes, actually, only 4 kinds of chroma Prediction Modes exist. For example, when the luma Prediction Mode is Vertical Prediction, Luma Angle and Vertical Prediction of the chroma correspond to the same Prediction Mode. At this time, additional binarization does not need to be performed on the Vertical Prediction. This redundancy is removed in the solution in this embodiment of the present invention, because the Luma Angle may replace the Vertical Prediction. In Table 3, actually, the Luma Angle is set to a first Mode, and a redundant Mode is removed. Then, the rest are other Prediction Modes sequentially arranged according to the size of an original chroma prediction mode Chroma Prediction Mode. After a Chroma Prediction Mode is transformed into a New Mode, binarization may be performed on the New Mode with reference to the binarization method in the background.

TABLE 3

Mapping between a Chroma Prediction Mode and a New Mode

| Chroma Prediction Mode | New Mode |
|---|---|
| Luma Prediction Mode is Vertical Prediction | |
| Luma Angle (Vertical Prediction) | Mode 0 |
| Horizontal Prediction | Mode 1 |
| DC Prediction | Mode 2 |
| Down-right Prediction | Mode 3 |
| Luma Prediction Mode is Horizontal Prediction | |
| Luma Angle (Horizontal Prediction) | Mode 0 |
| Vertical Prediction | Mode 1 |
| DC Prediction | Mode 2 |
| Down-right Prediction | Mode 3 |
| Luma Prediction Mode is DC Prediction | |
| Luma Angle (DC Prediction) | Mode 0 |
| Vertical Prediction | Mode 1 |
| Horizontal Prediction | Mode 2 |
| Down-right Prediction | Mode 3 |
| Luma Prediction Mode is Down-right Prediction | |
| Luma Angle (Down-right Prediction) | Mode 0 |
| Vertical Prediction | Mode 1 |
| Horizontal Prediction | Mode 2 |
| DC Prediction | Mode 3 |
| Luma Prediction Mode is another prediction mode (Prediction Mode) | |
| Luma Angle | Mode 0 |
| Vertical Prediction | Mode 1 |
| Horizontal Prediction | Mode 2 |
| DC Prediction | Mode 3 |
| Down-right Prediction | Mode 4 |

Decoding End:

After decoding is performed with reference to a decoding method in the background, the New Mode is transformed into the Chroma Prediction Mode in an inverse manner according to Table 3. That is when New Mode=0, the Chroma Prediction Mode is Luma Angle; otherwise, Chroma Prediction Mode= (((New Mode−1)<(luma Prediction Mode)) ? (New Mode−1): New Mode). Finally, decoding may be performed with reference to the solution in the background.

2. Corresponding to an example that the number of kinds of Prediction Modes is 5 when Intra Prediction is performed on a chroma component in the background, in a solution for coding and decoding an intra prediction mode adopted in the present invention, a table look-up manner may also be adopted, to look for a mapping between a chroma prediction mode and a binary code according to a luma prediction mode.

Encoding End:

When the luma Prediction Mode is one of the first 4 kinds of Prediction Modes, actually, only 4 kinds of chroma Prediction Modes exist. For example, when the Luma Prediction Mode is Vertical Prediction, Luma Angle and Vertical Prediction correspond to the same Prediction Mode. At this time, additional binarization does not need to be performed on the Vertical Prediction. This redundancy is removed in the solution in this embodiment of the present invention, because the Luma Angle may replace the Vertical Prediction. A mapping between a corresponding chroma prediction mode and a binary code is selected in Table 4 according to a Prediction Mode of a luma component to transform 5 kinds of chroma Prediction Modes into corresponding binary codes. A modified mapping between a chroma prediction mode and a binary code is shown in Table 4.

In a method for coding an intra prediction mode, a corresponding binarization method is selected based on a luma prediction mode to code a chroma prediction mode, and the coded chroma prediction mode is sent to a decoding end.

Specific coding steps are as follows:

1: Perform coding to obtain a luma prediction mode and a chroma prediction mode.

2: Look up, according to the luma prediction mode, a table to obtain a binary code corresponding to the chroma prediction mode, where among binary codes, a chroma prediction mode Luma Angle and a chroma prediction mode that is the same as the luma prediction mode use the same binary code.

3: Code the binarized chroma prediction mode, and write the coded chroma prediction mode into a code stream.

TABLE 4

Mapping between a chroma prediction mode and a binary code

| Chroma Prediction Mode | Binary Code |
|---|---|
| When Luma Prediction Mode is Vertical Prediction | |
| Luma Angle (Vertical Prediction) | 0 |
| Horizontal Prediction | 10 |
| DC Prediction | 110 |
| Down-right Prediction | 111 |
| When Luma Prediction Mode is Horizontal Prediction | |
| Luma Angle (Horizontal Prediction) | 0 |
| Vertical Prediction | 10 |
| DC Prediction | 110 |
| Down-right Prediction | 111 |
| Luma Prediction Mode is DC Prediction | |
| Luma Angle (DC Prediction) | 0 |
| Vertical Prediction | 10 |
| Horizontal Prediction | 110 |
| Down-right Prediction | 111 |
| Luma Prediction Mode is Down-right Prediction | |
| Luma Angle (Down-right Prediction) | 0 |
| Vertical Prediction | 10 |
| Horizontal Prediction | 110 |
| DC Prediction | 111 |
| Luma Prediction Mode is another prediction mode (Prediction Mode) | |
| Luma Angle | 0 |
| Vertical Prediction | 10 |
| Horizontal Prediction | 110 |
| DC Prediction | 1110 |
| Down-right Prediction | 1111 |

Decoding End:

After obtaining binary codes of the luma prediction mode and the chroma prediction mode, the decoding end may select a mapping between a binary code and a chroma prediction mode in Table 4 according to the luma prediction mode to decode the binary code of the chroma prediction mode, to obtain a corresponding chroma prediction mode.

In a method for decoding an intra prediction mode, a corresponding inverse binarization method is selected based on a luma prediction mode to decode a chroma prediction mode, and the decoded chroma prediction mode is used to complete a decoding process.

Specific decoding steps are as follows:

1: Decode a binary code stream.

2: Obtain binary codes of a luma prediction mode and a chroma prediction mode.

3: Look up a corresponding chroma prediction mode coding table according to the luma prediction mode to perform inverse binarization on the binary code of the chroma prediction mode, to obtain a chroma prediction mode, where among binary codes, a chroma prediction mode Luma Angle and a chroma prediction mode that is the same as the luma prediction mode use the same binary code.

4: Complete a decoding process based on the obtained chroma prediction mode.

TABLE 5

Mapping between a binary code and a chroma prediction mode

| Binary Code | Chroma Prediction Mode |
|---|---|
| When Luma Prediction Mode is Vertical Prediction | |
| 0 | Luma Angle (Vertical Prediction) |
| 10 | Horizontal Prediction |
| 110 | DC Prediction |
| 111 | Down-right Prediction |
| When Luma Prediction Mode is Horizontal Prediction | |
| 0 | Luma Angle (Horizontal Prediction) |
| 10 | Vertical Prediction |
| 110 | DC Prediction |
| 111 | Down-right Prediction |
| When Luma Prediction Mode is DC Prediction | |
| 0 | Luma Angle (DC Prediction) |
| 10 | Vertical Prediction |
| 110 | Horizontal Prediction |
| 111 | Down-right Prediction |
| When Luma Prediction Mode is Down-right Prediction | |
| 0 | Luma Angle (Down-right Prediction) |
| 10 | Vertical Prediction |
| 110 | Horizontal Prediction |
| 111 | DC Prediction |
| When Luma Prediction Mode is another prediction mode (Prediction Mode) | |
| 0 | Luma Angle |
| 10 | Vertical Prediction |
| 110 | Horizontal Prediction |
| 110 | DC Prediction |
| 1111 | Down-right Prediction |

Coding and decoding solutions in each embodiment of the present invention may all be implemented by adopting the foregoing table look-up manner, and are not limited to the manner.

3. If an intra prediction mode of the chroma component includes M kinds of Prediction Modes that are the same as those of the intra prediction mode of the luma component and includes N intra prediction modes exclusive to chroma including the Luma Angle, a binarization solution adopted in this embodiment of the present invention is as follows:

Encoding End:

Redundant Prediction Mode is removed according to a Prediction Mode of the luma component, that is, a Mode that is represented as a Mode k and is the same as the Luma Angle is removed, and then an original chroma Prediction Mode is transformed into a new Mode: New Mode. This New Mode can be obtained by transforming the Luma Angle into a smaller Mode, that is, a New Mode corresponding to the Luma Angle is a Mode i, where i is less than a maximum Mode, and i is less than or equal to k. Other Prediction Modes are sequentially arranged according numerals of the Modes. That is to say, if a Mode k is one of the M kinds of chroma Modes, a corresponding New Mode is obtained according to FIG. 4; otherwise, the New Mode is obtained according to FIG. 5. Then, binarization may be performed on the New Mode with reference to the binarization method in the background.

Figure 4:
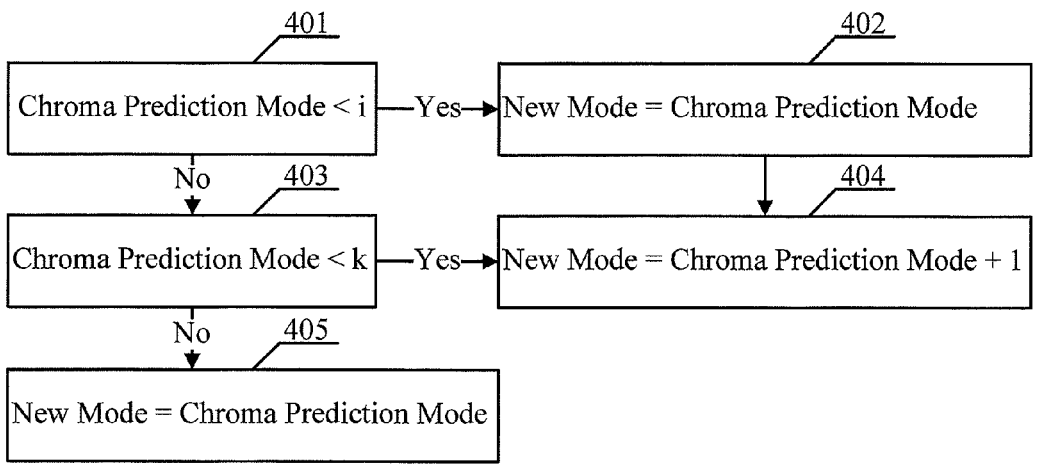
FIG. 4 is a schematic flow chart of a method according to an embodiment of the present invention.

Steps in FIG. 4 are as follows:
- 401: Determine whether Chroma Prediction Mode<i, if yes, proceed to 402, and if no, proceed to 403.
- 402: Determine that New Mode=Chroma Prediction Mode.
- 403: Determine whether Chroma Prediction Mode<k, if yes, proceed to 404, and if no, proceed to 405.
- 404: Determine that New Mode=Chroma Prediction Mode+1.
- 405: Determine that New Mode=Chroma Prediction Mode.

Figure 5:
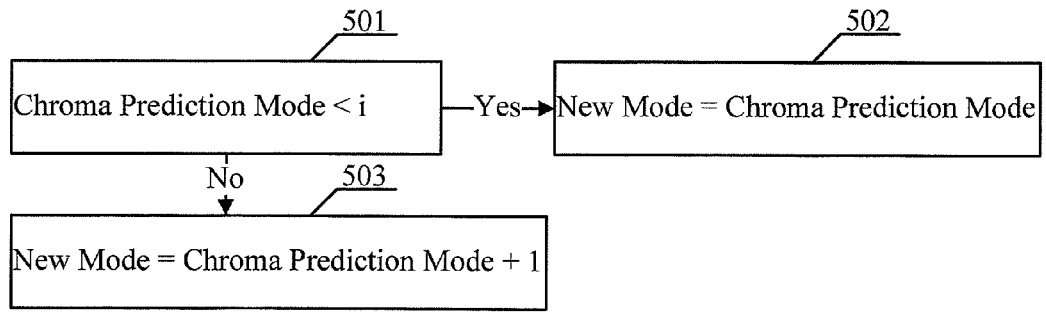
FIG. 5 is a schematic flowchart of a method according to an embodiment of the present invention.

Steps in FIG. 5 are as follows:
- 501: Determine whether Chroma Prediction Mode<i, if yes, proceed to 502, and if no, proceed to 503.
- 502: Determine that New Mode=Chroma Prediction Mode.
- 503: Determine that New Mode=Chroma Prediction Mode+1.

Figure 6:
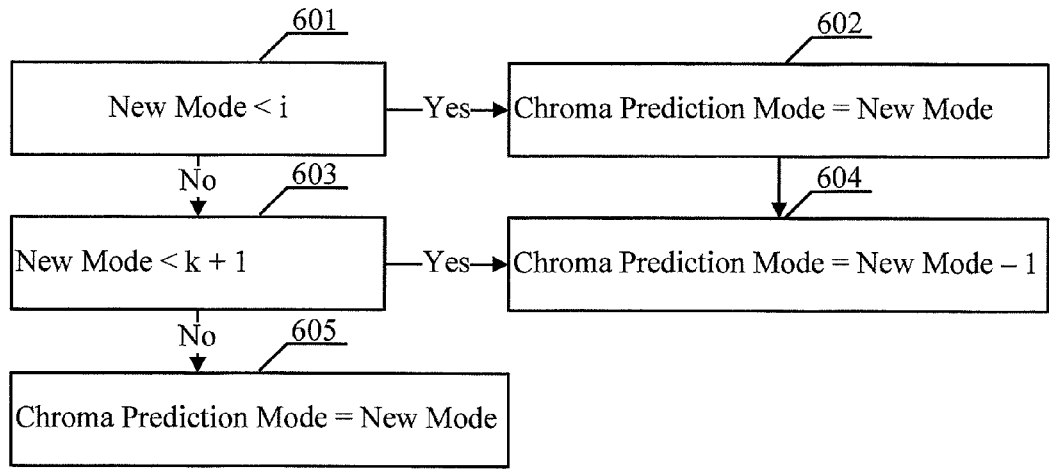
FIG. 6 is a schematic flowchart of a method according to an embodiment of the present invention.
Figure 7:
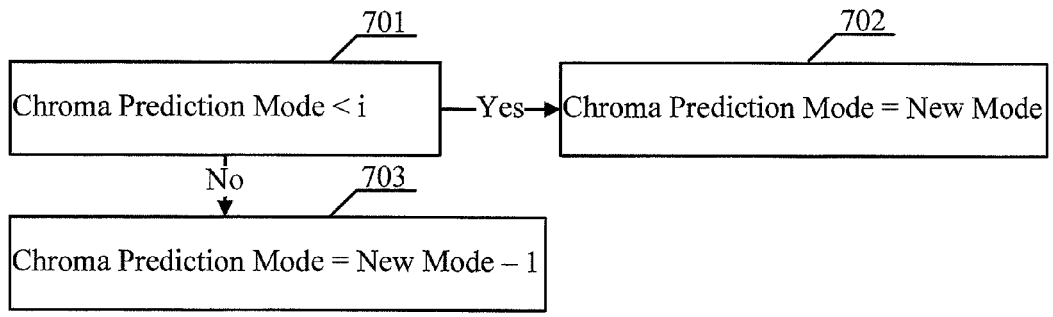
FIG. 7 is a schematic flowchart of a method according to an embodiment of the present invention.

Decoding End:

After decoding is performed with reference to the decoding method in the background, the New Mode is transformed into the Chroma Prediction Mode in an inverse manner, that is, when New Mode=i the Chroma Prediction Mode is Luma Angle; otherwise, if a direction represented by the Luma Angle is the Mode k in the M kinds of chroma Prediction Modes, the New Mode is transformed into the Chroma Prediction Mode according to a manner shown in FIG. 6, and if the direction represented by the Luma Angle is not the Mode in the M kinds of chroma Prediction Modes, the New Mode is transformed into the Chroma Prediction Mode according to a manner shown in FIG. 7. Finally, decoding may be performed with reference to the solution in the background.

Steps in FIG. 6 are as follows:
- 601: Determine whether New Mode<i, if yes, proceed to 602, and if no, proceed to 603.
- 602: Determine that Chroma Prediction Mode=New Mode.
- 603: Determine whether New Mode<k+1, if yes, proceed to 604, and if no, proceed to 605.
- 605: Determine that Chroma Prediction Mode=New Mode.
- 604: Determine that Chroma Prediction Mode=New Mode−1.

Steps in FIG. 7 are as follows:
- 701: Determine whether Chroma Prediction Mode<i, if yes, proceed to 702, and if no, proceed to 703.
- 702: Determine that Chroma Prediction Mode=New Mode.
- 703: Determine that Chroma Prediction Mode=New Mode 1.

Compared with the solution in the background, with this technology, coding efficiency is improved.

Figure 8:
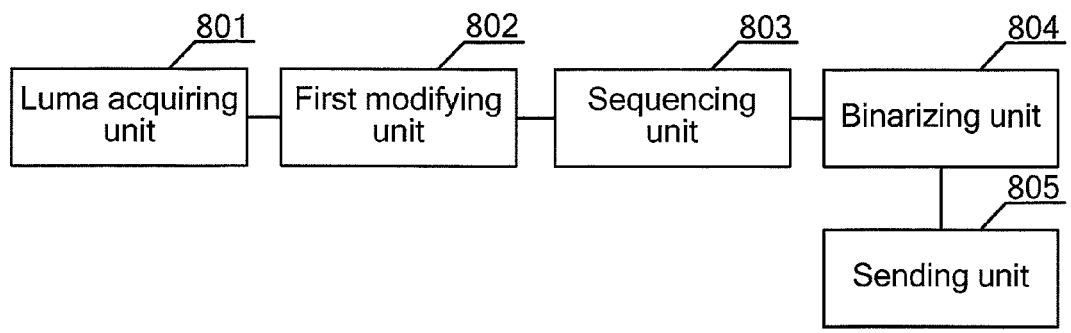
FIG. 8 is schematic structural diagram of an apparatus according to an embodiment of the present invention.

As shown in FIG. 8, an apparatus for binarizing an intra prediction mode includes:

a luma acquiring unit 801, configured to acquire an intra prediction mode of a luma component;

a first modifying unit 802, configured to: if the intra prediction mode of the luma component is one kind of prediction mode in M, modify a value of a serial number of a prediction mode Luma Angle of a chroma component to I, where a set of the same intra prediction modes of the luma component and the chroma component is M, and I is less than the value of the serial number of the Luma Angle, where the value is a value before modification;

a sequencing unit 803, configured to sequence all prediction modes of the chroma component except the acquired intra prediction mode according to a preset rule;

a binarizing unit 804, configured to perform binarization on the modified Luma Angle; and a sending unit 805, configured to send a binarization result to a decoding end.

Optionally, values of serial numbers of all the prediction modes of the chroma component are numbered successively with natural numbers.

The sequencing unit 803 is further configured to: if the acquired intra prediction mode is another prediction mode outside M, add 1 to a value of a serial number, which is less than or equal to a value of a serial number of the acquired intra prediction mode and greater than or equal to I, among all the prediction modes of the chroma component except the acquired intra prediction mode; and if the acquired intra prediction mode belongs to M, add 1 to a value of a serial number, which is less than I, among all the prediction modes of the chroma component except the acquired intra prediction mode.

More specifically, the values of the serial numbers of all the prediction modes of the chroma component are numbered successively with natural numbers, and I is a natural number that is greater than or equal to zero. The sequencing unit 803 is specifically configured to add 1 to a value of a serial number of a prediction mode whose serial number is greater than or equal to I among all the prediction modes of the chroma component.

Further, the first modifying unit 802 is further configured to: if the intra prediction mode of the luma component is another prediction mode outside M, modify the value of the serial number of the prediction mode Luma Angle of the chroma component to I, and the sequencing unit 803 is further configured to sequence all the prediction modes of the chroma component according to the preset rule.

Figure 9:
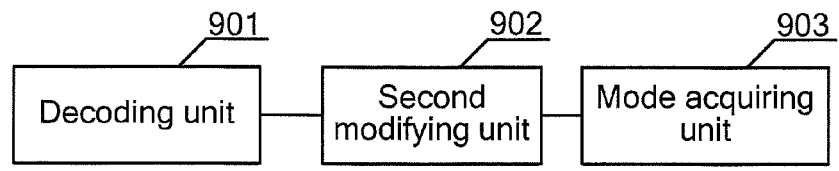
FIG. 9 is schematic structural diagram of an apparatus according to an embodiment of the present invention.

As shown in FIG. 9, a decoding apparatus includes:

a decoding unit 901, configured to perform decoding on a received coded video frame to obtain a prediction mode of a chroma component;

a second modifying unit 902, configured to: if an intra prediction mode of a luma component is one kind of prediction mode in M, modify a serial number I of a prediction mode Luma Angle of the chroma component to an original serial number of the Luma Angle, where the original serial number is a serial number before an encoding end modifies the Luma Angle, a set of the same intra prediction modes of the luma component and the chroma component is M, and I is less than a value of the serial number of the Luma Angle, where the value is a value before modification; and a mode acquiring unit 903, configured to acquire the prediction mode of the chroma component according to the original serial number.

Further, the second modifying unit 902 is further configured to: if the intra prediction mode of the luma component is another prediction mode outside M, modify the serial number I of the prediction mode Luma Angle of the chroma component to the original serial number of the Luma Angle, where the original serial number is a serial number before the encoding end modifies the Luma Angle.

Figure 10:
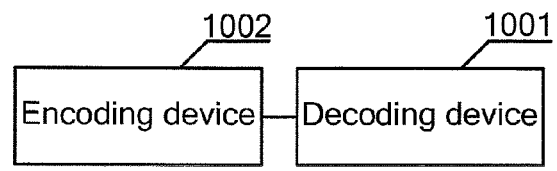
FIG. 10 is schematic structural diagram of a system according to an embodiment of the present invention.

As shown in FIG. 10, a communication system includes: an encoding device 1001 and a decoding device 1002, where the encoding device 1001 is the apparatus shown in FIG. 8, and the decoding device 1002 is the apparatus shown in FIG. 9.

In the embodiments of the present invention, if an intra prediction mode of a luma component is one kind of prediction mode in M, a value of a serial number of a prediction mode Luma Angle of a chroma component is modified to I. Then, all prediction modes of the chroma component except the acquired intra prediction mode are sequenced according to a preset rule. A set of the same intra prediction modes of the luma component and the chroma component is M, and I is less than the value of the serial number of the Luma Angle, where the value is a value before modification. Therefore, coding efficiency is improved.

Persons of ordinary skill in the art may understand that all or part of the steps of the methods in the embodiments may be implemented by a program instructing relevant hardware. The program may be stored in a computer readable storage medium. The storage medium may be a read-only memory, a magnetic disk, an optical disk, or the like.

The method for binarizing an intra prediction mode and the method, the apparatus, and the system for decoding an intra prediction mode that are provided in the embodiments of the present invention are introduced in detail in the foregoing. Specific examples are used for describing principles and implementation manners of the present invention. The foregoing descriptions of the embodiments are merely provided for helping understand the methods and core ideas of the present invention. Meanwhile, persons of ordinary skills in the art may make modifications to the specific implementation manners and application scopes according to the ideas of the present invention. In conclusion, the content of the specification shall not be construed as a limitation to the present invention.

What is claimed is:

1. A method for coding an intra prediction mode of a video frame, the method comprising:
    acquiring, by at least one processing device, an intra prediction mode of a luma component, if the intra prediction mode of the luma component is one kind of prediction mode in M, modifying a value of a serial number of a prediction mode Luma Angle of a chroma component to I, wherein the prediction mode Luma Angle means a chroma component prediction mode using a same prediction direction as the luma component, and then sequencing all prediction modes of the chroma component except the acquired intra prediction mode according to a preset rule, wherein
    a set of the same intra prediction modes of the luma component and the chroma component is M, and I is less than the value of the serial number of the Luma Angle, wherein the value is a value before modification; and
    performing, by the at least one processing device, binarization on the modified Luma Angle, and sending the binarized chroma prediction mode to the decoding end;
    wherein the preset rule comprises:
        if the acquired intra prediction mode is another prediction mode outside M, adding 1 to a value of a serial number, which is less than or equal to a value of a serial number of the acquired intra prediction mode and greater than or equal to I, among all the prediction modes of the chroma component except the acquired intra prediction mode, and
        if the acquired intra prediction mode belongs to M, adding 1 to a value of a serial number, which is less than I, among all the prediction modes of the chroma component except the acquired intra prediction mode;
    wherein values of serial numbers of all the prediction modes of the chroma component are numbered successively with natural numbers, and I is a natural number that is greater than or equal to zero.

2. The method according to claim 1, further comprising:
    if the intra prediction mode of the luma component is another prediction mode outside M, modifying the value of the serial number of the prediction mode Luma Angle of the chroma component to I, and then sequencing all the prediction modes of the chroma component according to the preset rule; and
    performing binarization on the modified Luma Angle, and sending the binarized Luma Angle to the decoding end.

3. The method according to claim 2, wherein the values of the serial numbers of all the prediction modes of the chroma component are numbered successively with natural numbers, and I is a natural number that is greater than or equal to zero; and
    performing the sequencing according to the preset rule comprises:
        adding 1 to a value of a serial number of a prediction mode whose serial number is greater than or equal to I among all the prediction modes of the chroma component.

4. The method according to claim 1, further comprising:
    performing coding to obtain a luma prediction mode and a chroma prediction mode, looking up, according to the luma prediction mode, a table to obtain a binary code corresponding to the chroma prediction mode, wherein among binary codes, a chroma prediction mode Luma Angle and a chroma prediction mode that is the same as the luma prediction mode use the same binary code; and
    coding the binarized chroma prediction mode and writing the coded chroma prediction mode into a code stream.

5. A method for decoding an intra prediction mode of a video frame, the method comprising:
    performing, by at least one processing device, decoding on a received coded video frame to obtain a prediction mode of a chroma component;
    if an intra prediction mode of a luma component is one kind of prediction component in M, modifying a serial number I of a prediction mode Luma Angle of the chroma component to an original serial number of the Luma Angle, wherein the prediction mode Luma Angle means a chroma component prediction mode using a same prediction direction as the luma component, wherein the original serial number is a serial number before an encoding end modifies the Luma Angle, wherein
    a set of the same intra prediction modes of the luma component and the chroma component is M, and I is less than a value of the serial number of the Luma Angle, wherein the value is a value before modification; and
    acquiring, by the at least one processing device, the prediction mode of the chroma component according to the original serial number;
    wherein if the intra prediction mode of the luma component is another prediction mode outside M, modifying the serial number I of the prediction mode Luma Angle of the chroma component to the original serial number of the Luma Angle, wherein the original serial number is a serial number before the encoding end modifies the Luma Angle; and
    acquiring the prediction mode of the chroma component according to the original serial number.

6. The decoding method according to claim 5, further comprising:
    decoding a binary code stream to obtain binary codes of a luma prediction mode and a chroma prediction mode;
    looking up a corresponding chroma prediction mode coding table according to the luma prediction mode to perform inverse binarization on the binary code of the chroma prediction mode, to obtain a chroma prediction mode, wherein among binary codes, a chroma prediction mode Luma Angle and a chroma prediction mode that is the same as the luma prediction mode use the same binary code; and completing the decoding process based on the obtained chroma prediction mode.

\* \* \* \* \*